United States Patent

Schmitt et al.

Patent Number: 6,151,546
Date of Patent: Nov. 21, 2000

[54] METHOD AND DEVICE FOR CONTROLLING TRACTION IN MOTOR VEHICLES

[75] Inventors: Johannes Schmitt, Markgroeningen; Thomas Sauter, Remseck; Andreas Zoebele, Markgroeningen, all of Germany

[73] Assignee: Robert Bosch GmbH, Stuttgart, Germany

[21] Appl. No.: 09/123,734

[22] Filed: Jul. 28, 1998

[30] Foreign Application Priority Data

Aug. 7, 1997 [DE] Germany ............... 197 34 112

[51] Int. Cl.⁷ .................................................. B60K 28/00
[52] U.S. Cl. .............................. 701/84; 701/82; 180/197
[58] Field of Search ......................... 701/82, 84, 87, 701/90, 72, 71; 180/197

[56] References Cited

U.S. PATENT DOCUMENTS

| | | | |
|---|---|---|---|
| 4,985,836 | 1/1991 | Hashiguchi et al. | 701/71 |
| 5,243,526 | 9/1993 | Ito et al. | 701/71 |
| 5,259,476 | 11/1993 | Matsuno | 180/197 |
| 5,696,683 | 12/1997 | Schäfer et al. | 364/426.027 |
| 5,737,713 | 4/1998 | Ikeda et al. | 701/84 |
| 5,742,917 | 4/1998 | Matsuno | 701/69 |
| 5,850,616 | 12/1998 | Matsuno et al. | 701/82 |
| 5,927,421 | 7/1999 | Fukada | 180/197 |

FOREIGN PATENT DOCUMENTS 43 44 634   7/1995   Germany.

*Primary Examiner*—Tan Nguyen
*Attorney, Agent, or Firm*—Kenyon & Kenyon

[57] ABSTRACT

A method and a device for controlling traction in a motor vehicle in which a maximum transmittable driving torque is calculated using operating parameters of the vehicle and its drive unit. One of these parameters is a quantity indicating the turning performance of the vehicle in cornering, such as the yaw or transverse acceleration of the vehicle.

9 Claims, 3 Drawing Sheets

METHOD AND DEVICE FOR CONTROLLING TRACTION IN MOTOR VEHICLES

FIELD OF THE INVENTION

The present invention relates to a method and a device for controlling traction in motor vehicles.

BACKGROUND INFORMATION

German Patent No. 43 44 634 describes a traction control system with influence on the engine, where a demand torque representing the maximum transmittable driving torque for stable driving performance is determined continuously using the operating parameters of the vehicle and its drive unit. If instability occurs, i.e., if unacceptable slip occurs on at least one driving wheel, the driving torque of the drive unit is reduced to the calculated demand torque. With the conventional traction control systems, unknown quantities are calculated as auxiliary quantities into the equivalent mass which is increased or reduced when a parasitic torque occurs. In addition to grade, load or towed load, the resistance force that occurs in cornering is also an influencing factor that is not completely known with the conventional traction control system. Therefore, this force is also part of the equivalent mass. However, the equivalent mass is PT1 filtered and is limited by grade, so that, with regard to dynamics, it is only an approximation of the parasitic torques that actually occur. Steady states are detected completely, but dynamic states are detected only partially. Therefore, the demand torque calculated for cornering is merely an estimate with regard to the resistance force due to cornering. In addition, the equivalent mass signal is time filtered for safety reasons, so that an adjustment of the demand torque in cornering is established only with a time lag.

SUMMARY OF THE INVENTION

An object of the present invention is to improve traction control in turning corners. A traction control system is shown, wherein the accuracy in determining the demand in cornering is improved. Therefore, the demand torque can be calculated more accurately and can be made to approach the stability limit. This greatly improves traction control in cornering.

Adjustment of demand torque to cornering takes place very rapidly, so that an accurate demand torque for cornering is available shortly after entering the turn. Therefore, if instability occurs, the driving torque of the drive unit can be adjusted very accurately to the torque constituting the stability limit, and this can be done as soon as the vehicle enters the turn.

Another advantage is that the traction control can be adapted to different types of vehicles (application). This is the case because the application of the traction control for turning a corner in a high-$\mu$ curve is uncoupled from the other application of the traction control system due to the fact that the resistance torque due to cornering is taken into account. This also guarantees that with correct application of a high-$\mu$ curve, the traction control performance will be satisfactory even in a low-$\mu$ curve.

DETAILED DESCRIPTION OF THE DRAWINGS

Figure 1:
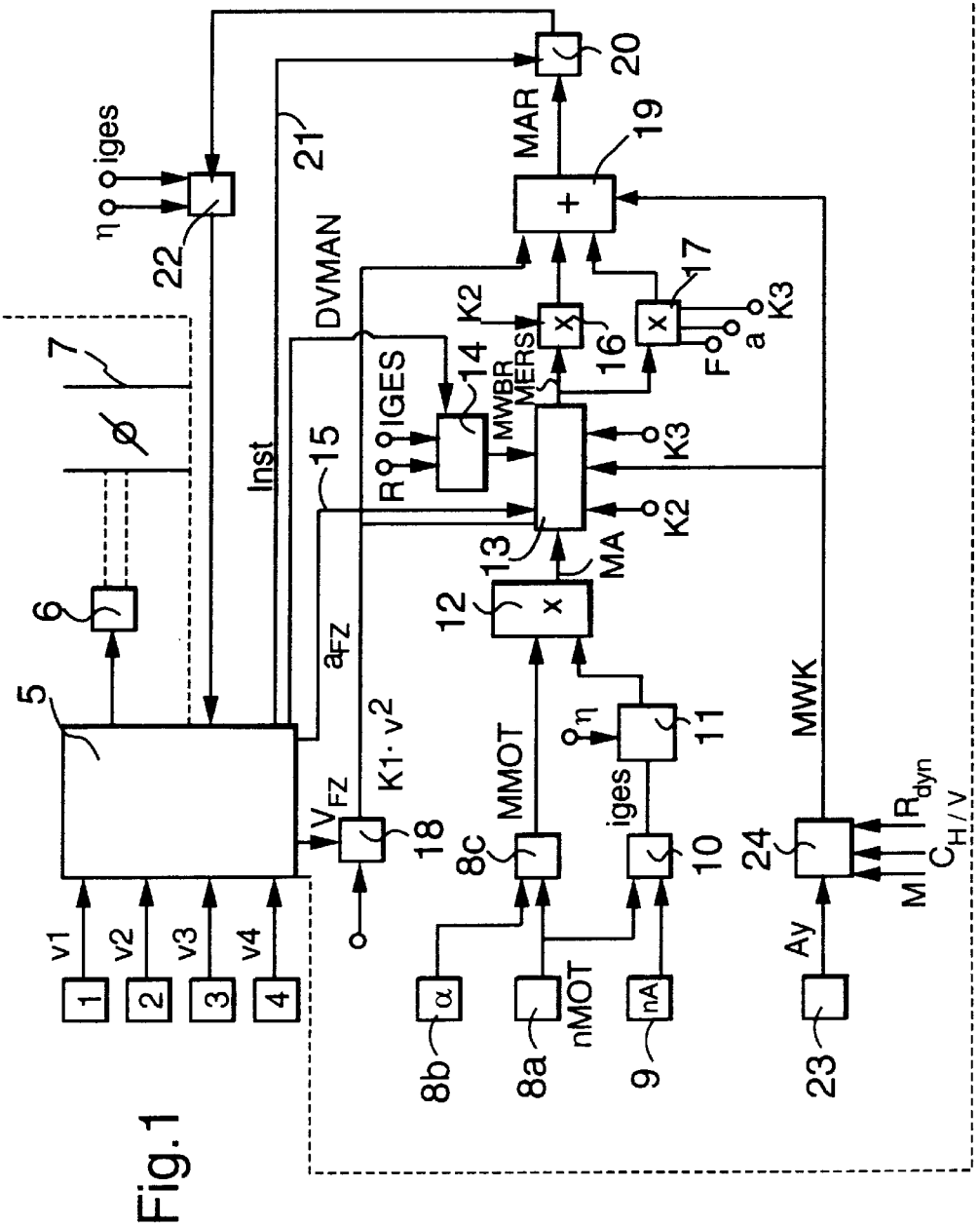
FIG. 1 shows a block diagram of a traction control showing measures for improvement in cornering.

FIG. 1 shows a traction control system with influence on the engine as a block diagram which corresponds essentially to the traction control system known from the art cited above. FIG. 1 shows wheel speed sensors 1, 2 of the driven wheels and wheel speed sensors 3, 4 of the non-driven wheels. In a preferred exemplary embodiment, analysis circuit 5 is a microcomputer of an electronic control unit which ascertains with the help of signals V1 through V4 of sensors 1 through 4 whether unacceptable wheel slip occurs on one or both wheels. As is known from the art, this is accomplished by comparing the wheel speeds of the driven wheels with a reference quantity formed from the wheel speeds of the non-driven wheels. If the resulting wheel slip of a wheel exceeds a predetermined threshold, an unacceptable wheel slip and thus an instability of the vehicle is detected. In this case, analysis circuit 5 triggers an actuator 6 which in turn controls a butterfly valve 7 of an internal combustion engine. In addition or as an alternative to influencing the butterfly valve, an influence on the timing angle and/or fuel metering to the engine is provided in other exemplary embodiments. With electric drives, the drive power of the electric motor is influenced accordingly by actuator 6.

The procedure for determining the demand torque MAR (maximum transmittable torque, reducing torque) is shown in detail as part of analysis circuit 5.

The procedure shown in FIG. 1 corresponds essentially to that known from the art. To improve the traction control and cornering by a vehicle and to reduce the driving torque to the possible transmittable torque in the event of an instability in cornering, this provides for a measure of the resistance torques that occur in cornering to be determined. It has proven suitable in determining the maximum transmittable torque to take into account the transverse acceleration of the vehicle. The maximum transmittable driving torque is determined as a function of the transverse acceleration of the vehicle. To do so, the resistance torque MWK due to cornering is calculated in adjustment to the traction control known in the prior art.

Starting from the conventional relationships for the resistance force due to cornering and the slip angle, an approximation equation for the resistance torque due to curves has been developed which describes the resistance torque due to curves with sufficient accuracy for the purposes of traction control.

The resistance force due to curves is derived from the following equation:

$$F_{rk} = M_{fz} * (v^2/R) * ([1_H/1]\sin \alpha_v + [1_v/1]\sin \alpha_h) \tag{1}$$

where $F_{rk}$ is a resistance force due to curve, $M_{fz}$ is a mass of vehicle, v is a velocity of vehicle, R is a radius of curve, $1_H$ is a distance between rear axle and center of gravity of vehicle, l is a wheel base, $1_v$ is a distance between front axle and center of gravity of vehicle, $\alpha_v$ is a slip angle at front axle and $\alpha_h$ is a slip angle at rear axle.

The slip angles are calculated according to the following equations:

$$\alpha_v = (M_{fz}/C_V) * (1_H/1) * (v^2/R) \tag{2}$$

$$\alpha_h = (M_{fz}/C_H) * (1_V/1) * (v^2/R) \tag{3}$$

where $c_v$ is an inclined positional rigidity at the front axle, $c_H$ is an inclined positional rigidity at the rear axle.

It is assumed that the center of gravity of the vehicle is at the center of the vehicle. This leads to the following simplification of the equation for resistance due to curves:

$$F_{rk}=M_{fz}*Ay*(0,5 \sin \alpha+0,5 \sin \alpha) \qquad (4)$$

because the following can be equated:

$$c_V=c_H=c_{H,V}; \ \alpha_v=\alpha_h=\alpha; \ l_H=l_V=\tfrac{1}{2}.$$

Therefore, $$F_{rk}=M_{fz}*Ay*\sin(M_{fz}/C_{H,V})*0,5*Ay \qquad (5)$$

At angles up to approximately 20°, which are essential in the application case described here, the sinusoidal expression corresponds to the corresponding angle in the radian measure, so the equation for the resistance due to a curve is further simplified as follows:

$$F_{rk}=M_{fz}^2*Ay^2*1/C_{H,V}*0,5 \qquad (6)$$

Then, resistance torque MWK due to curves is calculated from this equation, taking into account the wheel radius, using the following relationship:

$$MWK=M_{fz}^2*Ay^2*1/C_{H,V}*0,5*Rdyn \qquad (7)$$

where Rdyn is a wheel radius.

The resistance torque due to curves is thus calculated as a function of the transverse acceleration, otherwise as a function of pre-defined constants. Resistance torque MWK due to curves is included in the determination of maximum transmittable torque MAR, so that the engine torque established in the case of instability of the vehicle depends on the transverse acceleration of the vehicle.

Using the block diagram known from the art, FIG. 1 shows how the calculated resistance torque due to curves is included in the conventional traction control system to determine the maximum transmittable driving torque.

As described in the art, driving torque MA is calculated as a function of the butterfly valve setting a or an air mass signal HFM, engine speed nMot and output speed nA and taking into account the total gear transmission ratio iges and efficiency η of the drive train (see 8a, 8b, 8c, 9, 10, 11, 12). The performance quantities required for this such as butterfly valve setting α, engine speed nMot, output speed nA are detected by the traction control (i.e., analyzer circuit 5) by input of corresponding measurement signals. In the preferred exemplary embodiment, these quantities are supplied by other control units via a communication system, e.g., by an engine control unit and/or an automatic transmission unit, which supplies the engine torque, gear transmission ratio iges and efficiency η to the traction control in other advantageous exemplary embodiments, or in an especially advantageous exemplary embodiment, it supplies the output torque MA.

The driving torque MA is calculated from the efficiency η, the total transmission ratio iges of the gear and the engine torque Mmot, which is in turn determined from a curve as a function of engine speed and butterfly valve setting (or air mass). Efficiency depends on the total transmission ratio iges (the more teeth engaged per revolution, the lower the efficiency). Furthermore, another quantity to be taken into account with an automatic transmission is the transformer magnification factor $\mu$ which can be determined from input and output speeds:

$$MA=Mmot*iges*\eta(*\mu) \qquad (7a)$$

Analyzer circuit 5 also calculates vehicle velocity V and vehicle acceleration $a_{fz}$ as a function of the wheel speeds supplied, in particular as a function of the wheel speeds of the non-driven wheels. In addition to receiving the quantity for output torque MA, a dividing and subtracting block 13 also receives the vehicle acceleration $a_{fz}$, the term K1·V² from block 18, the acceleration resistance torque MWBR (block 14) determined as a function of the wheel radius Rdyn, the gear transmission ratio iges and the average acceleration DVMAN of the driving wheels, and preselectable constants K2 and K3. In addition, a signal representing the resistance torque MWK due to curves is also sent to dividing and subtracting block 13. This signal is calculated in block 24 as a function of the mass of the vehicle, the inclined positional rigidity of the front and rear axles, the wheel radius and the transverse acceleration Ay determined by measurement device 23 using the equation given above.

In a preferred exemplary embodiment, transverse acceleration Ay is calculated as a function of other operating parameters such as yaw, steer angle and/or wheel speeds (e.g., from the velocity difference of the non-driven wheels), so that in general terms, the maximum transmittable driving torque is a function of a quantity indicating the turning performance of the vehicle in cornering. In other exemplary embodiments, the transverse acceleration is detected by a suitable measurement device.

Subtracting and dividing block 13 calculates the equivalent mass MERS from the quantities supplied to it using the equation known from the art. The resistance torque in cornering is taken into account in the numerator of the term by subtraction:

$$MERS = \frac{MA - k1*V^2 - MWBR - MWK}{K3*afz + K2} \qquad (8)$$

As described in the art, the equivalent mass is then multiplied by quantity K2 or by quantity K3, vehicle acceleration $a_{fz}$ and a factor F in blocks 16 and 17, and the two quantities are sent to adder stage 19. The latter also receives the term K1*V² and the quantity representing the resistance torque MWK in cornering. The terms supplied are added to the maximum transmittable driving torque MAR in block 19:

$$MAR=K1*V^2+K2*MERS+K3*MERS*a_{fz}*F+MWK \qquad (9)$$

In the event of instability, i.e., when at least one driving wheel has unacceptable slip, the maximum transmittable driving torque MAR is transmitted as engine torque Mmot to analyzer circuit 5 or to actuator 6 for setting the engine torque, taking into account the gear transmission ratio iges and efficiency η of the power train (in 22).

When driving straight ahead, the calculated resistance torque in cornering is not in effect. The maximum transmittable driving torque MAR is then determined in the known manner. In cornering, the resistance torque in cornering is calculated as a function of transverse acceleration and is taken into account in calculating the maximum transmittable torque. This, and thus the engine torque ultimately established in the case of instability, depend on the transverse acceleration, with the maximum transmittable torque also increasing with an increase in transverse acceleration.

Figure 2:
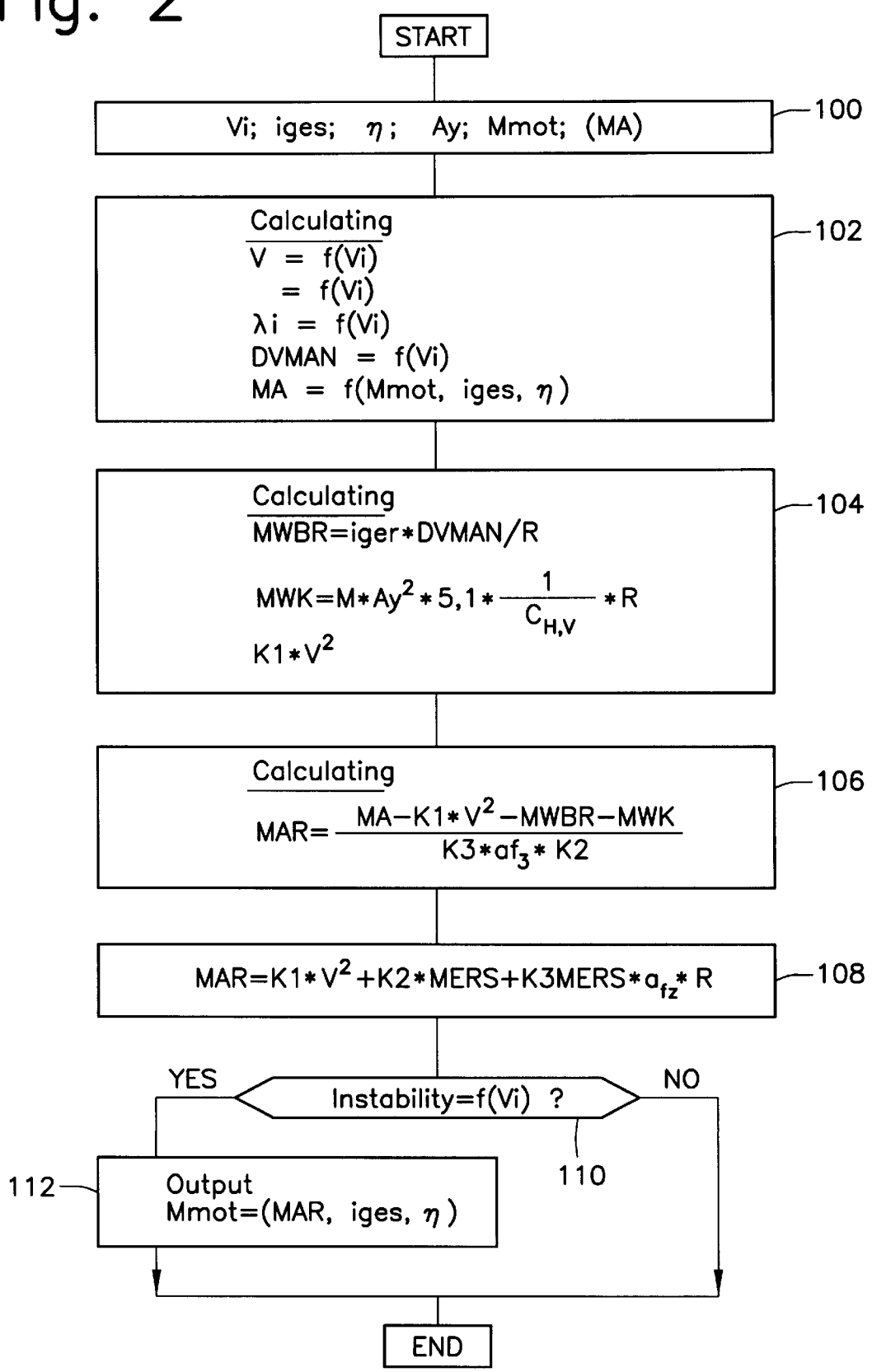
FIG. 2 shows a flow chart which outlines a preferred implementation of the control as a microcomputer program.

The procedure described here is preferably implemented as a microcomputer program in a control unit for the vehicle. Such a program is diagramed with the flow chart in FIG. 2 as an example. The program is run continuously at predetermined times during operation of the vehicle.

In the first step 100, the wheel speeds Vi, gear transmission ratio iges, gear efficiency η, transverse acceleration Ay and engine torque Mmot (or output torque MA) are entered as operating parameters. Then in step 102, the vehicle velocity V, vehicle acceleration $a_{fz}$, the slip of the individual driving wheels $\lambda_i$ and the average acceleration of the driving wheels DVMAN are determined as a function of the corresponding wheel speeds Vi. In addition, in the event it is not supplied by other units in step 100, the driving torque MA is determined as a function of engine torque Mmot, gear transmission ratio iges and optionally also the efficiency η. In the next step 104, the resistance torque MWBR in acceleration, the resistance torque MWK in cornering, and the air resistance torque $K1 \cdot V^2$ are calculated by the known equation. In the next step 106, the equivalent mass MERS is determined according to the given equation, and the maximum transmittable driving torque MAR is calculated from the calculated quantities in step 108 according to the equation described above. In the next inquiry step 110, a check is performed as a function of the wheel speeds to determine whether there is any instability, i.e., whether at least one of the driving wheels has an unacceptable slip. If this is not the case, this subprogram is terminated and is repeated at a given time, whereas in the event of an instability, the engine torque Mmot (more precisely, the engine reducing torque Mmotr) calculated from the maximum transmittable driving torque MAR, taking into account the transmission ratios in the drive train (iges, η), is output. After step 112, the program is also terminated and run the next time.

Figure 3:
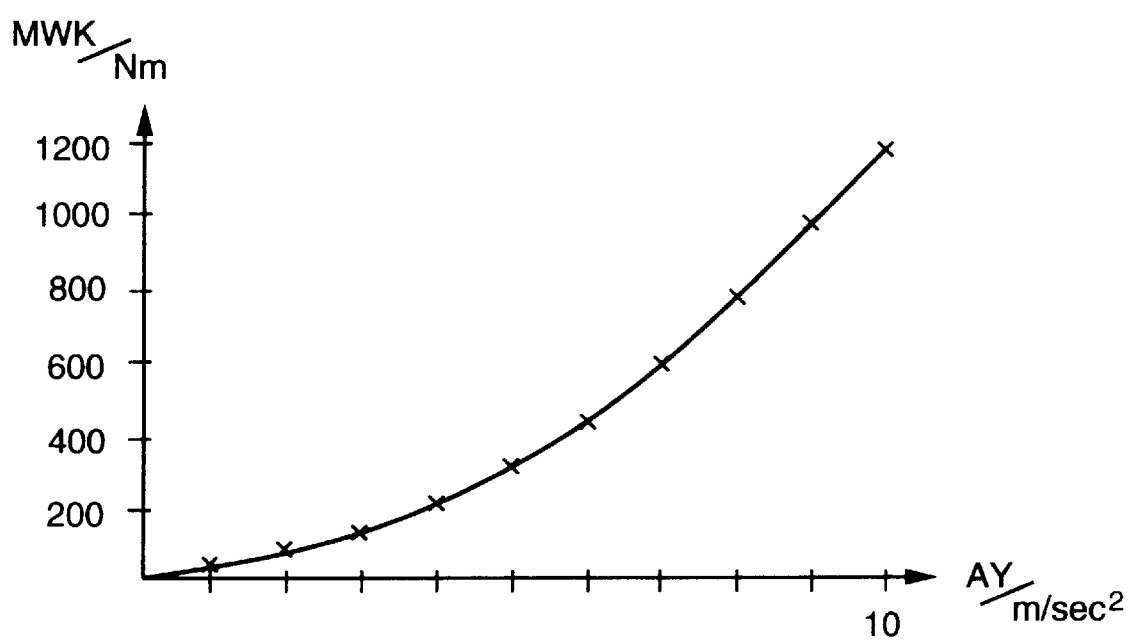
FIG. 3 shows an example of a dependence of the resistance torque due to cornering on the transverse acceleration of the vehicle.

FIG. 3 shows a diagram in which the calculated resistance torque MWK in cornering has been plotted as a function of transverse acceleration Ay in accordance with an embodiment of the present invention. The transverse acceleration assumes values from 0 to 10 m/sec². The mass of the vehicle is assumed to be 2000 kg, the inclined positional rigidity was assumed to be 50,000 N/rad. At the usual wheel radii, this yields resistance torque values of 0 to 1200 N/m. With an increase in transverse acceleration, the resistance torque MWK in cornering increases, so that the maximum transmittable driving torque MAR and the engine torque Mmot increase with an increase in transverse acceleration in the event of instability as a similar function. Therefore, the traction control system operates closer to the stability limit of the vehicle in cornering from the standpoint of engine intervention.

What is claimed is:

1. A method for controlling traction in a motor vehicle, comprising the steps of:

when a skidding tendency of at least one driving wheel of the motor vehicle occurs, adjusting a driving torque of a drive unit of the motor vehicle;

determining a maximum transmittable torque as a function of first operating parameters of the motor vehicle, second operating parameters of the drive unit, and a value indicative of a turning performance of the motor vehicle in cornering; and when a traction control is engaged, reducing the driving torque to the maximum transmittable torque determined in the determining step.

2. The method according to claim 1, further comprising the step of:

determining the value as a function of a transverse acceleration of the motor vehicle.

3. The method according to claim 2, further comprising the step of:

determining a yaw of the motor vehicle as a function of the value.

4. The method according to claim 3, further comprising the step of:

if one of the yaw and the transverse acceleration increases, increasing the maximum transmittable torque.

5. The method according to claim 1, further comprising the steps of:

determining a cornering resistance torque as a function of the value; and determining the maximum transmittable torque as a further function of the cornering resistance torque.

6. The method according to claim 1, further comprising the steps of:

determining the maximum transmittable torque as a further function of an air resistance torque, a rolling resistance torque, an accelerating resistance torque and a cornering resistance torque; and substituting a first vehicle mass of the rolling resistance torque with an equivalent weight and substituting a second vehicle mass of the accelerating resistance torque with the equivalent weight, the equivalent weight having an influence of parasitic factors on the maximum transmittable torque.

7. The method according to claim 6, further comprising the step of:

determining the equivalent weight as a function of the cornering resistance torque.

8. The method according to claim 1, further comprising the step of:

converting the maximum transmittable torque to an engine torque as a function of transmission ratios in a power train; and transmitting the engine torque to an actuator for adjusting the engine torque.

9. A device for controlling traction in a motor vehicle, comprising:

an analyzer unit adjusting an engine torque when a skidding tendency of at least one driving wheel of the motor vehicle occurs and determining a maximum transmittable torque for driving as a function of first operating parameters of the motor vehicle, second operating parameters of a drive unit of the motor vehicle and a value indicative of a turning performance of the motor vehicle in cornering, the analyzer unit reducing a driving torque of the drive unit to the maximum transmittable torque determined in the determining step when an instability occurs.

* * * * *

UNITED STATES PATENT AND TRADEMARK OFFICE
CERTIFICATE OF CORRECTION

PATENT NO. : 6,151,546
DATED : November 21, 2000
INVENTOR(S) : Schmitt et al.

Page 1 of 1

It is certified that error appears in the above-identified patent and that said Letters Patent is hereby corrected as shown below:

Column 3,
Line 40, change "...a..." to -- $\propto$ --.

Signed and Sealed this

Twentieth Day of November, 2001

Attest:

NICHOLAS P. GODICI
Attesting Officer       Acting Director of the United States Patent and Trademark Office